United States Patent
Gay

(10) Patent No.: US 6,792,145 B2
(45) Date of Patent: Sep. 14, 2004

(54) PATTERN RECOGNITION PROCESS FOR TEXT DOCUMENT INTERPRETATION

(76) Inventor: Robert W. Gay, 160 W. 71st St., Penthouse "G", New York, NY (US) 10023

( * ) Notice: Subject to any disclaimer, the term of this patent is extended or adjusted under 35 U.S.C. 154(b) by 88 days.

(21) Appl. No.: 09/877,836

(22) Filed: Jun. 8, 2001

(65) Prior Publication Data

US 2002/0154816 A1 Oct. 24, 2002

Related U.S. Application Data

(60) Provisional application No. 60/285,368, filed on Apr. 20, 2001.

(51) Int. Cl.$^7$ ................................................ G06K 4/46
(52) U.S. Cl. ........................ 382/190; 382/209; 705/30; 715/503
(58) Field of Search ................................ 382/181, 190, 382/195, 209, 218, 231, 305; 707/1–10; 715/509, 510, 533, 503; 705/30–34

(56) References Cited

U.S. PATENT DOCUMENTS

| | | | | |
|---|---|---|---|---|
| 5,033,009 A | * | 7/1991 | Dubnoff | 715/503 |
| 5,212,639 A | * | 5/1993 | Sampson et al. | 705/30 |
| 5,701,400 A | * | 12/1997 | Amado | 706/45 |
| 5,894,311 A | * | 4/1999 | Jackson | 345/440 |
| 5,937,155 A | * | 8/1999 | Kennedy et al. | 714/38 |
| 5,950,196 A | * | 9/1999 | Pyreddy et al. | 707/5 |
| 5,953,730 A | * | 9/1999 | Schawer | 715/503 |
| 5,956,422 A | * | 9/1999 | Alam | 382/181 |
| 5,970,476 A | * | 10/1999 | Fahey | 705/28 |
| 6,327,387 B1 | * | 12/2001 | Naoi et al. | 382/190 |

* cited by examiner

*Primary Examiner*—Daniel Mariam
(74) *Attorney, Agent, or Firm*—Bernard Malina; Malina & Wolson

(57) ABSTRACT

The present invention is directed to a method for extracting textual as well as tabular data material from financial documents. Initially, a comparison is made to determine the type of data schedule material provided in the document. Subsequently, the character strings of the financial document are compared to character strings provided in previous documents or in various databases. The database of the previous document would include the textual material in a first plane, and the tabular material also in that first plane. If a character string match is made between a new document and an old document, the new tabular data material would be provided in a data matrix in a second plane but the corresponding textual material would not be included in the textual matrix provided in that second plane. Only character strings not matched in the textual material of the first plane would be provided in the textual matrix of the second plane.

11 Claims, 7 Drawing Sheets

ITERATIVE TEXT RECOGNITION PROCEDURE FOR DATA IDENTIFICATION AND EXTRACTION

<u>Exhibit 1:</u>
T-O Text Map First Iteration 12 649459200 110IBM  Intl Business Machines Corporation
Filing date; period date; shares
Fiscal qtr; lower bound; upper bound
Net Income
Depreciation
Amortization of Software
Gain on dispostion of fixed and other assets
Net cash provided from operating activities
Payments for plant
Investment in software
Purchases of marketable securities and other investments
Proceeds from marketable securities and other investments
Net cash used in investing securities
Proceeds from debt issuance
Payments to settle debt
Short term borrowings less than     days net
Common stock transactions     net
Cash dividends paid
Net cash used in financing activities
Cash and cash equivalents
Net change in cash and cash equivalents
Cash and cash equivalents at January
Changes in operating assets and liabilities
Cash and cash equivalents at March
Proceeds from sale of the IBM global network

*FIG. 4*

ITERATIVE TEXT RECOGNITION PROCEDURE FOR
DATA IDENTIFICATION AND EXTRACTION

Exhibit 2: T-1 Text Map
Text String Variations found in the T-1 Document
That Were Indicated as Acceptable Variations
Over the T-0 Text String Version 48 - Investment Activities 50 - Proceeds from New Debt 52 - Cash and cash equivalents at September 54 - Cash and cash equivalents at June

*FIG. 5*

ITERATIVE TEXT RECOGNITION PROCEDURE FOR DATA IDENTIFICATION AND EXTRACTION

Exhibit 3:
T-0 Data Matrix $$56 \begin{cases} \begin{matrix}
0.0000 & 19990630.0000 & 1000000.0000 \\
20001113.0000 & 20000930.0000 & 58.0000 \\
20003.0000 & 58.0000 & 68.0000 \\
5423.0000 & 16.0000 & 1.0000 \\
3285.0000 & 11.0000 & 1.0000 \\
346.0000 & 11.0000 & 1.0000 \\
-710.0000 & 15.0000 & 1.0000 \\
4548.0000 & 17.0000 & 1.0000 \\
-2501.0000 & 14.0000 & -1.0000 \\
-406.0000 & 14.0000 & -1.0000 \\
-850.0000 & 30.0000 & 1.0000 \\
1335.0000 & 30.0000 & 1.0000 \\
-2422.0000 & 37.0000 & 1.0000 \\
7719.0000 & 31.0000 & 1.0000 \\
-6711.0000 & 31.0000 & 1.0000 \\
377.0000 & 42.0000 & 1.0000 \\
-4817.0000 & 32.0000 & 1.0000 \\
-694.0000 & 32.0000 & 1.0000 \\
-4126.0000 & 38.0000 & 1.0000 \\
-163.0000 & 40.0000 & 1.0000 \\
-2163.0000 & 39.0000 & 1.0000 \\
5043.0000 & 40.0000 & 1.0000 \\
-3796.0000 & 29.0000 & 1.0000 \\
2880.0000 & 41.0000 & 1.0000 \\
0.0000 & 29.0000 & 1.0000
\end{matrix} \end{cases}$$

$40 \nearrow \quad 42 \nearrow \quad 44 \nearrow$

FIG. 6

ITERATIVE TEXT RECOGNITION PROCEDURE FOR
DATA IDENTIFICATION AND EXTRACTION

Exhibit 4:
T-1 Data Matrix $$58 \begin{cases} \begin{array}{rrr} 0.0000 & 19990630.0000 & 1000000.0000 \\ 20000814.0000 & 20000630.0000 & 57.0000 \\ 20002.0000 & 57.0000 & 67.0000 \end{array} \end{cases}$$

| | | |
|---:|---:|---:|
| 3460.0000 | 16.0000 | 1.0000 |
| 2246.0000 | 11.0000 | 1.0000 |
| 220.0000 | 11.0000 | 1.0000 |
| -425.0000 | 15.0000 | 1.0000 |
| 2485.0000 | 17.0000 | 1.0000 |
| -1571.0000 | 14.0000 | -1.0000 |
| -262.0000 | 14.0000 | -1.0000 |
| -453.0000 | 30.0000 | 1.0000 |
| 880.0000 | 30.0000 | 1.0000 |
| -1406.0000 | 37.0000 | 1.0000 |
| 4796.0000 | 31.0000 | 1.0000 |
| -4048.0000 | 31.0000 | 1.0000 |
| 290.0000 | 42.0000 | 1.0000 |
| -3624.0000 | 32.0000 | 1.0000 |
| -458.0000 | 32.0000 | 1.0000 |
| -3044.0000 | 38.0000 | 1.0000 |
| -91.0000 | 40.0000 | 1.0000 |
| -2056.0000 | 39.0000 | 1.0000 |
| 5043.0000 | 40.0000 | 1.0000 |
| -3016.0000 | 29.0000 | 1.0000 |
| 2987.0000 | 41.0000 | 1.0000 |
| 0.0000 | 29.0000 | 1.0000 |

*FIG. 7*

PATTERN RECOGNITION PROCESS FOR TEXT DOCUMENT INTERPRETATION

RELATED APPLICATIONS

This application claims priority from Provisional Application No. 60/285,368 filed Apr. 20, 2001.

FIELD OF THE INVENTION

The present invention is directed to a method for extracting raw data from documents including textual information and data information.

BACKGROUND OF THE INVENTION

It is no secret that we are truly living in the information age. Information is being generated at exceedingly higher and higher rates every day. For many years, this information was only recorded in paper form. However, with the advent of computers, in many instances, this information never even finds its way onto the printed page. Rather, this information is electronically generated and stored in the memory of a vast array of computers.

Although this information can take many forms and can be used for many purposes, due to the regulatory nature of our society, governmental requirements necessitate the compilation and publication of documents relating to, among other things, the business community. For example, the Securities and Exchange Commission (SEC) requires the compilation and publication of various statistics relating to a company's status. This documentation is generally promulgated on a periodic basis and would include files such as 10-Q or 10-K financial documents which are made available to the public.

As can be appreciated, due to the periodic nature of these publications, the entries included in these and other financial or other types of documents are fairly standard. For example, most of these documents would include one or more lines of textual material and one or more columns of data associated with each of the lines of textual material. Therefore, to properly use the information included in these financial documents, the information contained therein should be scanned into the memory of a computer. By doing such a scanning process, the data associated with the textual strings (usually in tabular form) must be extracted from the financial document in a manner which is effective and accurate. A number of prior art U.S. patents are directed to various systems and methods of extracting tablets from printed documents. One such patent is U.S. Pat. No. 5,956,422, issued to Alam. This patent describes a processor utilizing a method for recognizing, capturing and storing tabular data as a pixel-format document image or as formatted text. The pixel-format document image may then either be directly processed to locate tabular data or may be processed by an optical character recognition system to obtain the formatted text. After locating the tabular data either in a received pixel format document image or in the formatted text, the tabular data is extracted directly from cells present in either form of digital computer data or the tabular data located in the pixel format document image may first be processed by the OCR to obtain formatted text before extracting the tabular data. As illustrated with respect to FIGS. 2a, 2b, 2c, 2d, the purpose of this patent is to merely locate the area of a document in which the tabular data is present and then extract the data from that document. Although the document does contain textual material, the actual textual material is irrelevant to the extraction process.

U.S. Pat. No. 5,953,730, issued to Schawer, shows a system for manipulating spreadsheet program data which appears in tabular format.

U.S. Pat. No. 5,033,009, issued to Dubnoff, describes a method for automating the production of worksheet files used by an electronic spreadsheet program. As shown in FIG. 1, a worksheet file generator 30 operates in response to pattern data 32, variable data 34 and command data 36. However, it would appear that this patent is directed to a method of formulating the electronic spreadsheet and not extracting data from that spreadsheet.

SUMMARY OF THE INVENTION

The deficiencies of the prior art are addressed by the present invention which is directed to a method and system for extracting identified data from text blocks, usually included in columns of numbers associated with particular character string definitions. A number of iterative passes are made of a particular document to accurately extract the data schedule as well as the particular data associated with the character strings of a data schedule.

Although the present invention is directed to extracting data from raw SEC documents such as 10-Q or 10-K financial documents which have been, for example, downloaded from a particular website, the present invention is not to be construed as being so limited and would have applicability to any type of document in which one or more columns of numerical data is associated with textual character strings provided in a separate column.

As can be appreciated, many financial documents are published on a periodic basis. Each new addition of this document for a particular company would be very similar to previous documents. Therefore, the present invention would utilize a system in which previously extracted information in prior data reporting periods would be used to search the newly downloaded document for corresponding, or very similar, textual character strings. This similarity includes specific data schedules as well as similar textual strings produced in each of the data schedules. Once the newly downloaded document was properly searched, using previously parsed data schedules, the specific financial data schedules such as balance sheet, income statement and cash flow located within a large aggregate data file would be extracted and stored into data schedule text files as well as tabular files including numerical information. This process is an iterative one and, an operator will be used to physically review portions of the documents in which no character string match has occurred. Once the data schedule is broken into its descriptive text section and the tabular numerical data section, this material can be extracted from the raw document verified and updated if necessary.

An initial text matrix is created containing a row for each row of the data schedule containing a data item. Three columns are associated with each of the rows, one column containing the data, a second column including a database reference number and a third column containing a unit value indication of the sign of the data. The number of rows of the text matrix is provided on a first plane and the three columns which produce the data matrix is also provided on a first plane. The text strings of succeeding documents are searched by comparing them to text strings of the text matrix of the initial document. If a match is found, corresponding information is provided on a second data matrix included in a second plane including the same numbering rows and columns as the first document. No corresponding character string would be included in the appropriate row in a second plane text matrix. Variations of the text string included in the first text matrix plane would be provided in the appropriate location in a second or subsequent text matrix plane. Completely new text strings would also be provided in a new row in the first text matrix plane. Subsequent screening of additional documents would result in the creation of additional text matrix plane and data matrix planes.

It is to be understood that both the foregoing general description and the following detailed description of the present invention are exemplary and explanatory only and are not restrictive of the invention as claimed.

The accompanying drawings, which are incorporated in and constitute a part of the specification, illustrate the present invention and together with the description, serve to explain the principals of the invention.

BRIEF DESCRIPTION OF THE DRAWINGS

FIG. 4 is a text map showing various character strings in a financial document in a first plane;

FIG. 5 is a text map showing acceptable variations of the text strings shown in FIG. 4 provided in a second plane;

FIG. 6 is a data matrix of one financial document provided in a first plane; and FIG. 7 is a data matrix of a second financial document in a second plane.

DETAILED DESCRIPTION OF THE INVENTION

The present invention describes a system and method of extracting tabular information from a document including at least one column of textual information and at least one column of numerical data information. Although the particular documents which would utilize the system and method of the present invention are not important, for explanatory purposes, the present invention will be described with respect to raw SEC documents such as 10-Q or 10-K financial documents that have been downloaded directly from a governmental or other website. It is contemplated that this new financial document will be analyzed based upon previous analysis of similar financial documents generated by the same company that has generated the new financial document. This is particularly true since it is required that many of these documents be issued in a periodic manner. These documents include data schedule files such as balance sheets, income statements and cash flow statements which have already been extracted in prior data reporting periods. The present invention also contemplates the use of sequential text files that are both company and data schedule specific containing character strings which represent a collection of individual financial data item names, whose corresponding numerical values have been permanently stored in a database during prior data reporting periods. These files are known as data map files and contain actual individual financial data item names and may include spelling variations due to discrepancy caused by human error or individual data entry style preference. This is of particular importance since a number of the textual items in a series of documents may be exactly the same with the exception of a particular month of the year or other small variation.

Figure 1:
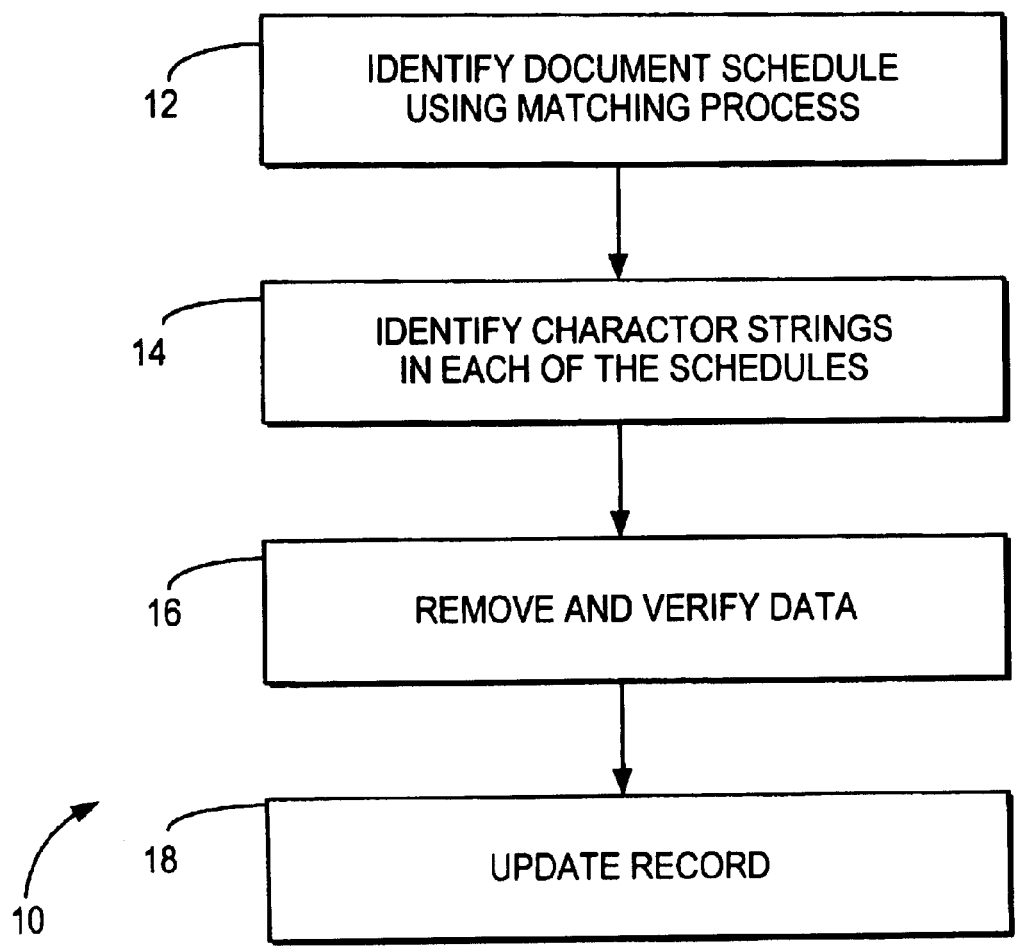
FIG. 1 is a block diagram showing the general operation of the present invention.

The system 10 of the present invention is generally described in FIG. 1. This figure includes a step of identifying one of several schedules generally included in most financial documents at step 12. These particular financial documents which form the basis of the process of the present invention generally includes one or more lines of textual material as well as one or more columns of data associated with each of the textual material. Once a particular schedule is identified at step 12, the character strings included in the textual material must be determined at step 14. Once this is accomplished, the data associated with each of the character strings are removed and verified at step 16 and the data is then updated at step 18.

Figure 2:
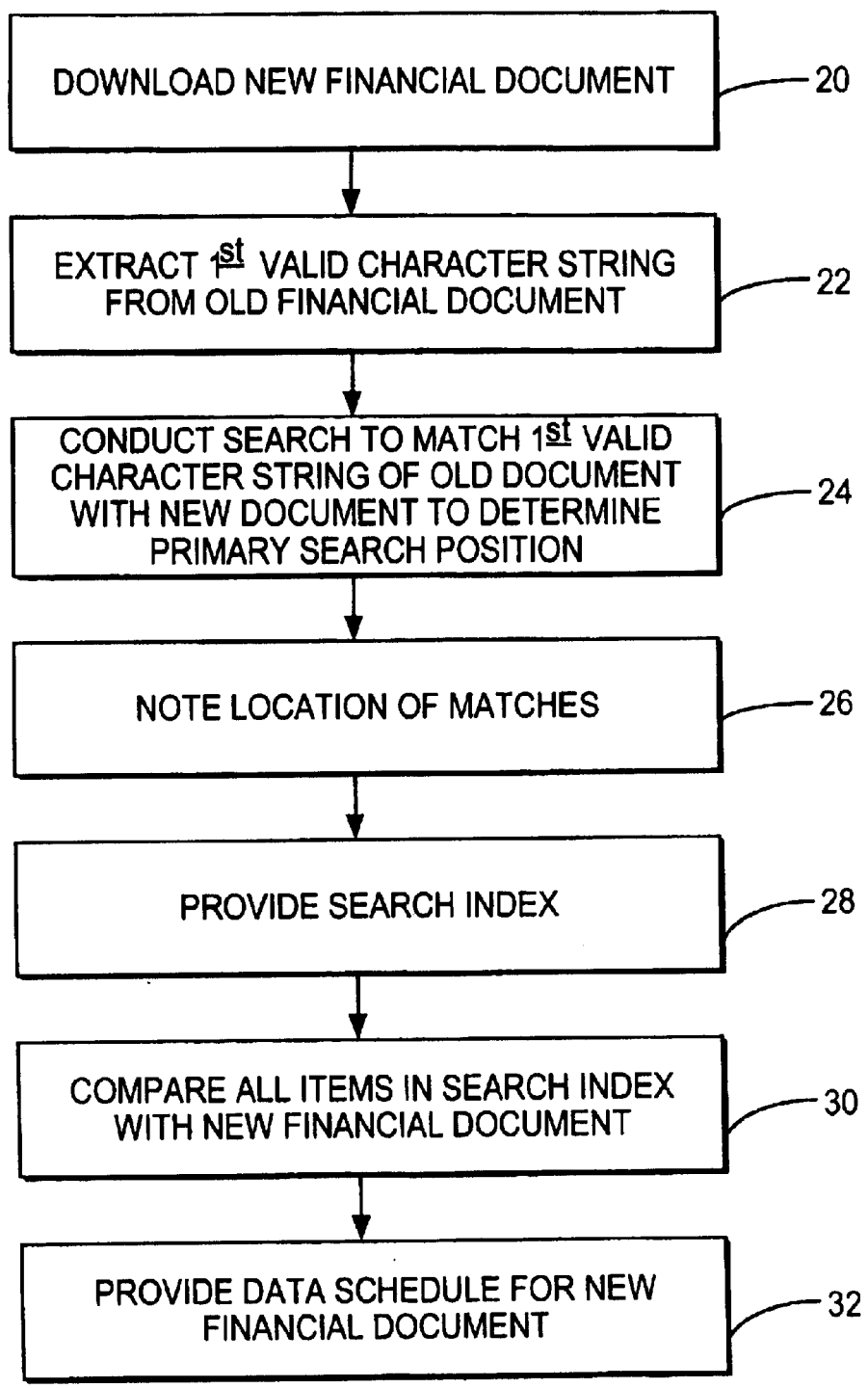
FIG. 2 is a block diagram showing a process of identifying a data schedule.

FIG. 2 illustrates the method of determining the appropriate schedule of the financial document. A new financial document is downloaded into the system of the present invention at step 20. Initially, it is important to find a primary search position identifier within the raw financial document. This is accomplished by extracting a first valid character string 22 from an old or existing previously parsed data schedule. This data schedule is a specific data schedule already extracted from a large aggregate data file in a prior data reporting period. This first valid character string is used as the primary search position identifier within the new financial document. There is no limit to the number of instances in which this character string can match character string embedded within the new financial document in every instance the match must be scrutinized by further detailed searching. This search is conducted at step 24. Therefore, when a match is found, the location of each of these matches must be noted at step 26. If no matches are found within the new financial document, the process will default to attempt matches within the new financial document with built-in typical "canned" character strings such as the words "balance sheet", "income statement" and "cash flow" or the like to locate the particular schedule of interest. Any matches located by either of the above-noted processes will be stored in a memory for further processing.

Once this initial search is completed and the primary search position identifier is located, a second phase of the search process would begin by inputting all character strings stored in a "data map file". Each data map file is structured sequentially with each line of the file containing a unique character string that represents the actual name of a financial data item that was previously extracted and whose numerical value is permanently stored in the proper database during a prior data reporting. Once all of the data map file search strings have been inputted, a unique search index has been created as is illustrated by step 28. This search index is then applied to every instance of the primary search position identifier from the first part of the search.

Every search index attempt is given a specific range (a multiple of the length of the data map file) in which matches may occur within the financial document. This compartmentalizes the search index regions within the financial document and allows for comparison of search results between the different search index regions. As each regional search index is being performed, summary data relevant to each search is recorded in the memory. This summary data could include but is not limited to (a) location of the starting position of a specific search region within the financial document as determined by the initial search; (b) the total number of matches to each specific search index region determined by the second phase of the search; (c) the location of the ending position of the search region within the financial document as determined by the second portion of the search.

Once all of the regions are searched at step 30, a set of summary data exists for each data region. This data is used to determine which region the financial document should be identified as the specific data schedule and subsequently extracted as shown by step 32.

Since it is known that specific data entries in the raw document might not precisely match the character strings used in the search process, it would be suitable if these similar but not exact data string matches are noted. The present invention utilizes a rule in which if a certain percentage or greater of character strings match a particular textual data entry, a match will be considered to be made. Although the exact percentage is not of crucial importance, the present invention utilizes a 50% rule.

All of the search processes would be repeated separately for each specific data schedule type such as balance sheet, income statement and cash flow. It is only after all of these three specific data schedule types have been identified with the new financial document that the extraction occurs and output files are generated.

In addition to the specific data schedule text, each output file contains a standardized HTML header which renders the file contents compatible for display in a web browser accessing a particular web site, but does not alter the structure of the specific data schedule. The header would generally include a company's name as well as their ticker symbol if appropriate. Therefore, in the example of a raw SEC document, a separate output file is created for the balance sheet schedule, the income statement schedule and the cash flow schedule. Each specific data schedule contains the exact text as it exists in the raw SEC document with the exception of the embedded HTML tags. Each specific data schedule is first passed through a filter, which identifies any of a predetermined set of HTML tags, which, if encountered, are replaced with blank spaces prior to outputting them to a file. This prevents any HTML formatting information from being carried over from the raw SEC document into the newly created data schedule output files as completely separate from the addition of a standardized HTML header as described hereinabove.

Figure 3:
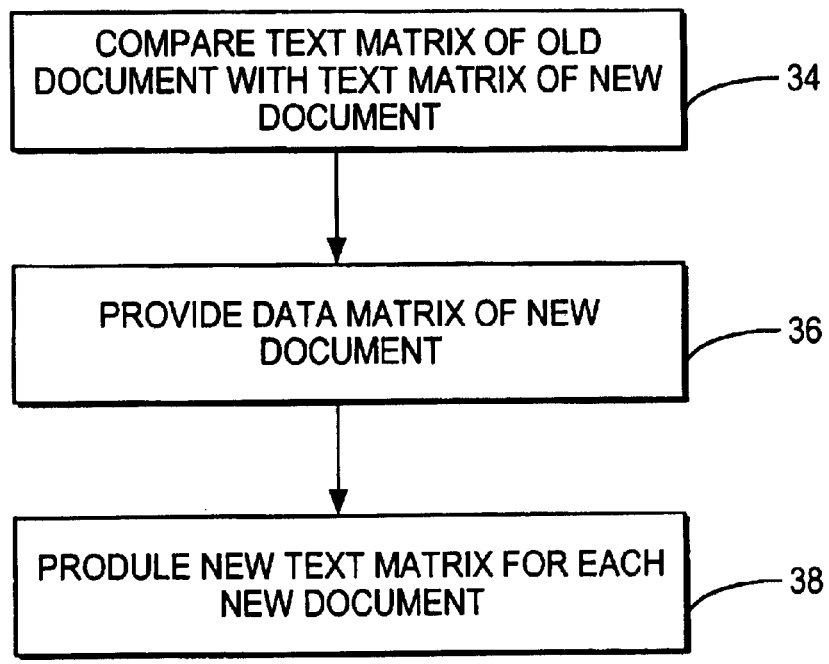
FIG. 3 is a block diagram showing a process of identifying character strings.

FIG. 3 illustrates a block diagram of the process of identifying and verifying the character strings provided in a particular data schedule. Generally, a data schedule can be broken into a descriptive text section as shown in FIG. 4, as well as a data section as shown in FIG. 6. Once the financial document is determined to be a particular data schedule, it is important to compare each of the descriptive text lines with the descriptive text lines provided in an old financial document or a data base as shown in step 34 of FIG. 3. The descriptive text section of FIG. 4 is said to produce a text matrix of a first plane. The database associated with this text matrix is shown in FIG. 6 containing a number of columns 40, 42 and 44. Each of the textual material in FIG. 4 would be associated with one row of the data matrix of FIG. 6. This data matrix is also provided in a first plane. The document T0 whose descriptive text section is shown in FIG. 4 must be read and defined for the procedure according to the present invention to iterate successfully. The text matrix is constructed containing a row for each row of the schedule containing a data item. Text string rows are populated with the text string associated with that data value, unless there is text on the row above the row containing the data item. If the row above the data item contains text, but no data, an operator is presented both rows to verify that the text string associated with the value appears on multiple lines. The number of lines of text associated with the data value was indicated by the operator, and a composite line text reference is associated with that data value. In this manner, the data matrix as shown in FIG. 6 containing three columns and the number of rows in the text matrix of FIG. 4 is constructed. The first column of the data matrix contains the data value associated with the corresponding text string. The second column contains a database reference number associated with a single or composite data item consistent with a time series record of the company and the cross sectional item across all companies. The database reference numbers are assigned to each row of the T0 document by an operator. The third column 44 contains a unit value indication of positive or negative sign of a variable. This unit variable preserves the consistency of the sign of a variable provided in column 44 over time. For example, a variable such as an interest expense for taxes could be presented in certain situations as a positive value or in other situations as a negative value. This is illustrated by the large number of negative values provided in column 40. Over time, a variable in column 40 can change from a positive value to a negative value. The sign of the value of the second occurrence must be reversed in column 44 to remain consistent with the sign of the value of the first occurrence. This is illustrated by the fact that in column 44, two of the unit values have a negative value and the remaining unit values have a positive value.

Once the text string associated with the data values are extracted from the schedule, variable database reference numbers are assigned to each textual data string. Therefore, during successive iterations of new documents at steps 36 and 38, if the exact text string for "net income" as shown in line 46 of FIG. 4 is discovered in subsequent documents, the database reference numeral would be the same in any subsequent data matrix. It is noted that each of the subsequent data matrixes are provided in separate planes. If, however, subsequent iterations of a document such as T1 does not include the data strings shown in document T0, a new text matrix, as shown in FIG. 5, would include lines 48, 50, 52 and 54. These lines would indicate variations from the lines provided in the textual matrix of FIG. 4. In this manner, a new data matrix 36 as well as a new textual matrix 38 are produced. Each of these new data matrixes and textual matrixes are provided in corresponding additional planes from the first data matrix and textual matrix.

Local information regarding each of the documents is saved in the first rows of the data matrix shown in FIG. 6 by reference numeral 56 and in FIG. 7 by reference numeral 58.

Row 1, columns 1 and 2 can be reserved for future use. Row 1, column 3 is a data value multiplier. SEC filers usually present accounting data values in thousands of dollars. Sometimes the value multiplied could be in millions of dollars, or just dollars and these multipliers must be retained across companies and across time to ensure that all values are the same denomination. Row 2 stores information on the filing date of the document, the record date of the document and the column number that marks the end of the text section and beginning of the data section of the schedule.

Starting with input document and working one line at a time starting at line 1, test each line for both the existence of a numeric character and the '$' character. Using "alphtonums" function, convert the suspected character number to a real number. If the process fails, move on to the next line. Verify that there are no alpha characters immediately before/after the '$' sign. Using the first numeric character after the '$' as a starting point, find the first blank space. This is the considered the end of that number, or 'end'. A variable named 'bonds' is now set to a starting position corresponding to that of the '$' and ending with 'end'. Clear the contents of the current line by setting all positions up to 'end' to a blank space and repeat all the above steps once more in order to search for more potential columns of data delineated by '$'. If another columnar bound is found, add its start and end positions to 'bounds' variable.

Determine next the number of columns in the document, which is found by the number of times a given line recurs in 'bounds'.

Next determine the width of each column. For each line referenced in 'bounds', take the leftmost position of the column (start) and subtract 12 from this value and count the number of other lines in bounds that have this value as their starting point, i.e., if the first bound has a starting position of 60, then count the number of lines that have a starting position of 59. Take this sum and store it. Do the same process for the same starting position minus 2, and then add the number of lines that match this starting value to the stored sum. After going through this procedure for each line referenced in 'bounds' we have a set of numbers that equate to the number of lines in the document that have column starting positions on or near each other. We then take the largest number in this set and that is considered the most likely starting position for the entire column of data in the document. The ending position for the column is the ending position for that line.

The present invention also contains software to ensure that a valid date of the document is determined.

In order to accomplish this, character representations of dates are converted to their numeric counterparts. Examples of the character representations that are converted might be 'September 31, 2000' or 'Sep 31, 2000'. The converted date would be in the form 20000931. Both upper and lowercase versions as well as numbers followed by commas and those not must be taken into account.

A. Create a mask of exact same shape as the input document. Mask consists of all blank characters initially.

B. Using keywords that represent months, search for the location of any such strings within the document and if found overlay an 'm' In the corresponding location on the mark. For example, if on a given line that was found to have 'April 20 1999', the same line in the mask would now contain 'mmmmm' in the location of 'April'.

C. Perform the same process for YEAR and DAYU keywords, populating the mask with 'y' and 'd' where those strings were found.

D. The end result is a mask filled in only where valid dates were found. A typical mask string might look like 'mmmmm dd yyy' for 'April 20, 1999'.

E. Convert all strings in the mask to numeric values using "convertdate" routine, which simply takes the characters associated with the 'm d & y' in the mask from the document and associates that with a numeric value. For example, if the mask on a given line contained 'mmm dd yy' and the corresponding location in the document contained 'JAN 31, 99', then "convertdate" would convert the 'mmm' from 'JAN' to 1, the 'dd' from "31" to 31, and the 'yy' from '99' to 99.

F. Since a date may continue across a line boundary, i.e., part of the data may be on one line and the remainder or another, an attempt is made to construct the date using components on several lines if necessary. For instance, the year component for a date is often the topmost element and stands alone. The month and day may occur one or more lines below this in the document. In other cases the month and day stand alone above the year, which follows on a line or two below. This format is common in documents that utilize a columnar representation of data.

G. The narrowest section of a document possible should be used as input to this function, since after all dates within a section are found it will accept only the latest date in passing a value back to the calling program. For example, if within the first 20 lines of a document, a line containing three different dates is located, the latest date would be returned, so for 20000131, 20010331 and 200110630, the 20010630 date would be selected.

Row 3 contains the fiscal quarter end of the document, the beginning of the data range associated with that fiscal quarter, and the end of the data range. The fiscal quarter-end information is important because the cash flow schedule is usually presented as accumulated values through the fiscal year. Therefore, first quarter data values must be subtracted from second quarter values to produce an accurate value for the quarterly cash flow items.

After document T0 has been reviewed by an operator (assuming that this is the first document of a particular type inputted into the system), the textual matrix shown in FIG. 4 and its associated data matrix shown in FIG. 6 are provided on one plane. When document T1 is downloaded into the system, its period information is extracted and compared to period information in the database. If no match is found, then it is assumed that this document is new to the system. If this occurs, a new plane is created for both the textual matrix as well as the data matrix. This would transform the data array into three dimensions with the second plane containing the data values, associated database reference numbers, and the sign for the T1 Schedule.

The T1 Schedule is searched for each text string in the T0 text matrix. If an exact match is found, the data value within data range of the schedule is placed in the first column of the second plane of the data matrix corresponding to the row of the matching text string. For any T0 text matrix test strings that are not found, the operator is prompted. Frequently the data value is indicated with a character string that is a small variation of the string searched for. If so, the operator indicates the character string that is an acceptable variation over the search string from T0. The alternative character string is retained on the second plane of the now three-dimensional text matrix. The number of planes on the text matrix becomes a function of the largest number of text string variations accumulated over time. Text strings that are not found are indicated as not available in the T1 document with a default value (0.0001).

Any text strings that remain in the T1 schedule after all T0 text strings are identified are searched for among matrixes of globally acceptable strings for each database value. If the search is not successful, the operator must provide the database reference until all data values are assigned their appropriate reference number.

When schedule T1 is completely searched, another document, such as document T2, is accessed and the target schedules removed as previously described.

The document date information is extracted and compared to the values stored on the first and second planes of the data matrix. If no document-date match is found, a third plane is created. Each character string on the first plane of the text matrix is searched for in the target T2 schedule. If the search fails, the second plane variation is searched for. If the second search fails, the operator is prompted. If there is an acceptable text string variation on the T3 schedule, it is indicated and saved on the first available plane of the text matrix. In this way the process accumulates information about acceptable variations for each text string. After three of four iterations, the text matrix contains information about all acceptable text string variations used in the presentation of the financial statements and the number of operator prompts falls moving the process towards full automation.

Database reference values provide information on the calculation of composite variable definitions for updating the time-series data record. Broad revenue, cost and other financial definitions, calculated cross-sectionally must be assembled from the micro data presented by each company. A cross sectional macro variable such as total revenue might have several sub categories when presented by an individual company. These sub-categories might be different from other companies and can also change over time. The database reference value associated with each character string provides the information for the calculation of the composite variable for each company and records any variation in the variable definition over time. These composite variable definitions are designed to be match the presentation in any existing cross-sectionally consistent composite-variable database.

While the invention has been particularly shown and described with reference to the preferred embodiment thereof, it will be understood to those skilled in the art that the frequency and other changes in form and details may be made therein without the departing from the spirit and scope of the invention.

What is claimed is:

1. A method for extracting raw data from documents containing textual material in various rows of one column and tabular material in at least a second column, the second column containing the various rows comprising the steps of:
   reviewing a first document to identify schedule information in said first document;
   identifying textual character strings in the various rows of said first document identified in said previous step;
   extracting said textual character strings from said first document;
   assigning database reference numbers to each of said textual character strings identified in said previous step;
   creating a first matrix of textual character strings provided on a first plane; and
   creating a first data matrix provided on a first plane, said data matrix provided in the first column of tabular material extracted from said first document and a second column including said database reference numbers; and
   reviewing a second document to identify schedule information in said second document;
   identifying textual character strings in the various rows of said second document identified in said previous step by comparing textual character strings in said second document with textual character strings identified in said first document;
   assigning database reference numbers to each of said textual character strings of said second document not included in said first document;
   creating a second matrix of textual character strings provided on a second plane including only those textual character strings not included in said first matrix of textual character strings; and
   extracting a second data matrix, from said second document in a second plane, said second data matrix provided with a first column of tabular material and a second column including said database reference numbers.

2. The method for extracting raw data in accordance with claim 1 further including the step of including a third column in said first data matrix, said third column provided with a unit value indication.

3. The method for extracting raw data in accordance with claim 2 wherein said unit value is a positive or negative number.

4. The method in accordance with claim 1 further including the step of including a third column in said second data matrix, said third column provided with a unit value indication.

5. The method for extracting raw data in accordance with claim 4 wherein said unit value is a positive or negative number.

6. The method in accordance with claim 1 further including the step of including a third column in said nth data matrix, said third column provided with a unit value indicator.

7. A method for extracting raw data from documents containing textual material in various rows of one column and tabular material in at least a second column, the second column containing the various rows comprising the steps of:
   identifying textual character string in the various rows of a first document identified;
   extracting said textual character strings from said first document;
   assigning database reference numbers to each of said textual character strings identified in said previous step;
   creating a first matrix of textual character strings provided on a first plane; and
   creating a first data matrix provided on a first plane, said data matrix provided in the first column of tabular material extracted from said first document and a second column including said database reference numbers; and
   identifying textual character strings in the various rows of said second document identified by comparing textual character strings in said second document with textual character strings identified in said first document;
   assigning database reference numbers to each of said textual character strings of said second document not included in said first document;
   creating a second matrix of textual character strings provided on a second lane including only those textual character strings not included in said first matrix of textual character string; and
   extracting a second data matrix from said second document in a second plane, said second data matrix provide with a first column of tabular material and a second column including said database reference numbers.

8. The method for extracting raw data in accordance with claim 7, further including the step of including a third column in said first data matrix, said third column provided with a unit value indicating.

9. The method for extracting raw data in accordance with claim 8 wherein said unit value is a positive or negative number.

10. The method in accordance with claim 7 further including the step of including a third column in said second data matrix, said third column provided with a unit value indication.

11. The method for extracting raw data in accordance with claim 10 wherein said unit value is a positive or negative number.

* * * * *